Sept. 8, 1970            G. E. SAUER           3,528,046
INTERLACED DISK WINDING WITH IMPROVED IMPULSE VOLTAGE GRADIENT
Filed Nov. 22, 1966
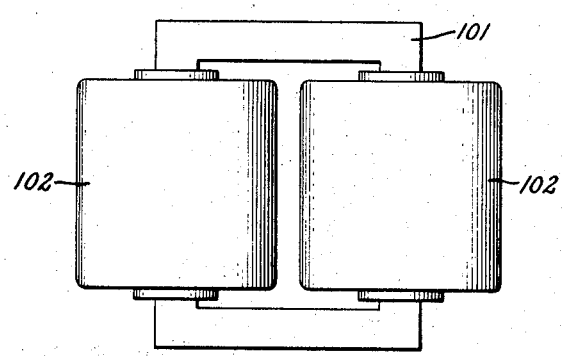
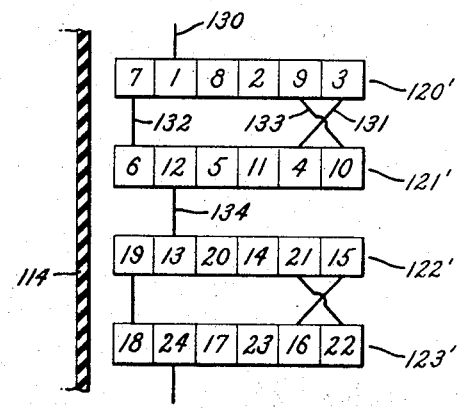
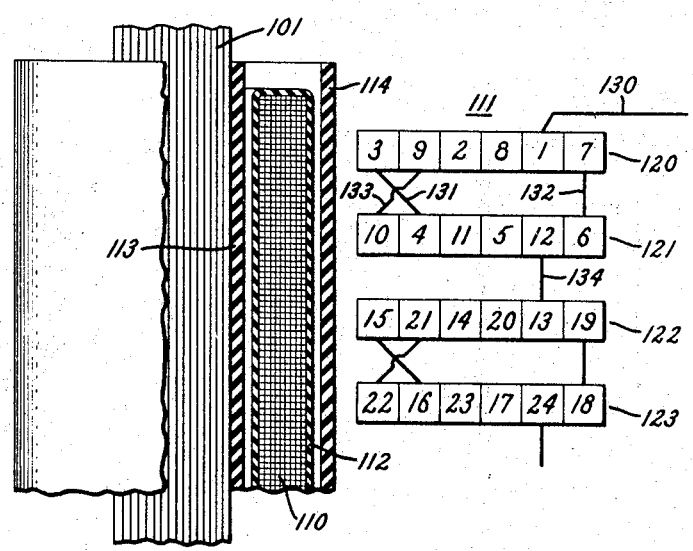
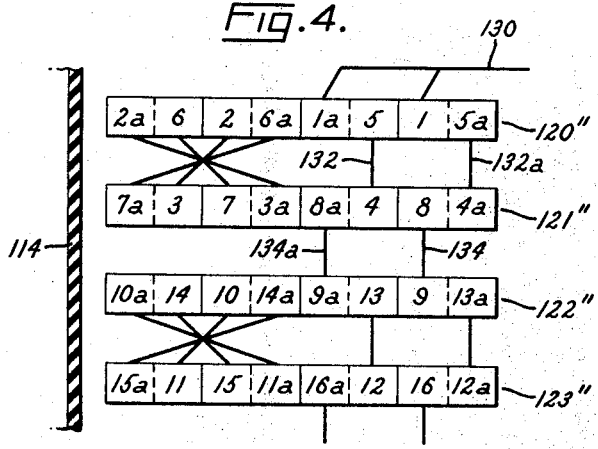
INVENTOR:
GEORGE E. SAUER
BY
ATTORNEY

United States Patent Office

3,528,046
Patented Sept. 8, 1970

3,528,046
INTERLACED DISK WINDING WITH IMPROVED IMPULSE VOLTAGE GRADIENT
George E. Sauer, West Stockbridge, Mass., assignor to General Electric Company, a corporation of New York
Filed Nov. 22, 1966, Ser. No. 596,217
Int. Cl. H01f 15/14
U.S. Cl. 336—70                                6 Claims

ABSTRACT OF THE DISCLOSURE

This application discloses an indicative winding of the disk type wherein each disk coil comprises at least one group of at least two radially interwound spiral conductors and the conductors of at least two adjacent coils are connected in re-entrant series interlaced relation. In each set of re-entrantly connected coils, the series circuit traverses first one conductor in each coil of the set and thereafter repeats its traverse of the set in like coil sequence through all remaining conductors of one conductor group. By utilizing one innermost end turn of each conductor group as the high voltage terminal end of each coil, the maximum voltage gradient between inner peripheral turns of axially adjacent coils and sets of coils is minimized.

---

My invention relates to windings for electric induction apparatus such as transformers, reactors and the like. The invention is directed particularly to means for improving voltage distribution throughout a high voltage winding and reducing insulation stresses created by application of steep wave front impulse voltages such as lightning and switching surges.

It is well known that highly inductive windings such as iron core transformer and reactor windings, when exposed to steep wave front impulse or transient voltages, exhibit initially an exponential distribution of voltage drop along the length of a winding with a very high voltage gradient at the first few turns adjacent the high voltage end. This condition arises because the winding presents to steep impulse voltages an impedance which is predominantly capacitive. Such capacitive impedance is made up of a complex network of capacitance in series and parallel relation. If series capacitance only were present, voltage distribution throughout the winding would be substantially uniform and linear. It is therefore desirable to construct a winding in such a way that the series capacitance is large relative to paralleled or ground capacitance in the network.

One common type of high voltage winding for transformers and reactors is the so-called disk winding wherein each of a plurality of annular coils is wound as a radial spiral, the coils being disposed coaxially on the core and connected electrically in series circuit relation. In such a disk winding it is known that series capacitance may be increased and impulse voltage distribution improved by interleaving a group of several spiral conductors in each coil and connecting the conductors of several coils in interlaced series relation, as illustrated in Pat. 2,453,552–Stearn. In referring to such a disk or "pancake" winding, I use the term "coil" to mean a single annular stack of at least two radially interwound spiral conductors. Within such coil each full turn of one conductor is called a "turn." Where interleaved coil conductors of a selected set of coils are connected in interlaced series relation before the winding circuit proceeds to a coil beyond that set, the interlaced set is called a winding "section." Such interlacing may be carried out with two or more conductors in each coil, so that the number of turns in each coil may be odd or even, and the number of coils in each set may be odd or even.

In a disk type winding either the inner or the outer peripheral edge turns of adjacent coils are necessarily electrically spaced apart in the series circuit, so that impulse voltage drops between such turns may be very large at the high voltage end of the winding. While juxtaposed intermediate turns of adjacent coils are also spaced apart in potential by the voltage drop through several turns, these intermediate turns do not present any sharp corners at which electrical stress may concentrate. As the peripheral edge turns, however, the stress may become excessive. This problem is especially acute with an interlaced connection of disk coils. In such a case the voltage difference between adjacent edge turns of coils in different winding sections (i.e., interlaced coil sets) may be greater than the sum of the turn voltages in an entire section. This condition is more severe if low voltage parts, such as core iron or the low voltage winding, are nearby.

It is therefore a principal object of my invention to provide improved means for minimizing electrical stress between juxtaposed inner and outer coil edges in interlaced disk type inductive windings.

More particularly, it is an object of my invention to provide a new and improved series interlacing sequence for disk type electric windings designed to minimize the voltage drop and electrical stress between juxtaposed inner and outer edges of coils in adjacent winding sections.

It will be understood by those skilled in the art that in referring to the high voltage terminal end or ends of a winding, I mean to identify the so-called "line" terminal portions as distinguished from grounded or neutral voltage portions. Thus a winding grounded at one end has only one high voltage line terminal, while if grounded at an intermediate point, it may have two line voltage ends. Similarly, delta connected windings have high voltage terminals at both ends relative to a lower voltage center point. My invention is equally applicable to all such high voltage winding ends.

In carrying out my invention in one preferred embodiment, I interconnect in re-entrant series interlaced relation the several radially interleaved conductors in each coil of a set of adjacent disk type coils, the series circuit entering the high voltage terminal end of each coil at one peripherally innermost end turn of that coil. More specifically, each coil of a set of coils connected in interlaced series circuit relation is formed of at least one group of at least two conductors wound together in spirally interleaved relation. In such a coil the inner and outer peripheral end turns of the several conductors in the group are radially adjacent each other. My invention contemplates that in each coil the conductor highest in voltage in the series circuit be so selected that its high voltage end turn is the innermost (i.e., farthest from the inner or outer peripheral turn) of all adjacent end turns in the interleaved conductor group. For example, in a single series circuit having two conductors per coil (i.e., singly reentrant) the incoming high voltage lead is connected to the second turn from the inner or outer peripheral edge of each coil winding. Depending upon whether the coil is upwound or downwound in the interlaced set of coils, this second turn may be adjacent either the inner or the outer peripheral turn. In either case it is one innermost end turn of the conductor group in that coil. For winding sections made up of interlaced coils having any number of conductors per coil, the maximum section-to-section edge stress between adjacent coils is very substantially diminished when the high voltage terminal end of each coil is located at such innermost end turn of the conductor group in that coil. Location of the high voltage coil terminal on any other end turn of the conductor group results in a much higher edge stress between adjacent coils and coil sections at the inner coil periphery.

It will be apparent to those skilled in the art that in referring to windings having "sections" of interlaced coil sets, I do not mean to suggest that an entire winding need be so constructed. Interlacing is time consuming and expensive, and is most useful only at the high voltage end or ends of a winding. It is therefore not uncommon to wind the lower voltage portion of such a winding with single conductor disk coils connected in direct series relation.

My invention will be more fully understood and its various objects and advantages further appreciated by referring now to the following detailed specification taken in conjunction the accompanying drawing in which:

FIG. 1 is a general side elevational view of an electric induction apparatus to which my invention is applicable;

FIG. 2 is a fragmentary cross-sectional view of an electric transformer having a high voltage disk type winding embodying by invention; and FIGS. 3 and 4 are diagrammatic representations of disk type winding sections illustrating other embodiments of my invention.

Referring now to the drawing, I have shown at FIG. 1 a core type electric induction apparatus having a rectangular magnetic core 101 including a pair of parallel side legs upon each of which are mounted current conducting windings indicated generally by the reference numeral 102. As shown in greater detail at FIG. 2, each winding 102 in the case of a typical core type transformer comprises a low voltage primary winding 110 adjacent the core 101 and a high voltage secondary winding 111 of the multiple disk type concentrically surrounding the low voltage winding. The low voltage winding may be of any appropriate configuration and is shown by way of example as a helical winding encased in a suitable insulating sheath 112. The space between the winding 110 and the core 101 is filled, at least partially, by a tubular insulating spacer 113. The radial space between the low voltage winding 110 and the high voltage winding 111 is referred to as the transformer main gap, and a tubular insulating sleeve 114 is provided in this space.

It will be understood as the description proceeds that while I have shown for the purpose of illustration a core type transformer having a primary winding portion and a secondary winding portion on each of two side legs, my invention is equally applicable to shell-type transformers and to reactors or other apparatus including high voltage inductive windings whether of the single phase of multiphase type. My inventon itself concerns more particularly the interlaced coil structure and connection of at least a part of a high voltage winding. In the case illustrated, the invention concerns the high voltage winding 111 of a transformer, and the invention is equally applicable whether such winding be designated "primary" or "secondary" in the transformer. It will be further understood that at FIGS. 2, 3 and 4, there is illustrated only a high voltage end portion of a high voltage winding, and that the remainder of the winding continues through as many additional annular coils as may be desired in accordance with the voltage rating. The low voltage end of the winding and the core may be connected to ground or other low potential point. If the winding be of the balanced type with both ends connected to high voltage line conductors and an intermediate or central point at low voltage (such as ground or the like), the fragmentary views of FIGS. 2, 3 and 4 illustrate suitable construction for each high voltage end of the winding.

Referring now more particularly to FIG. 2, the disk type high voltage winding 111 comprises a plurality of annular coils 120, 121, 122 and 123, each formed of a group of two radially interleaved conductors. Each of the four coils shown has three turns in each of its two conductors and all 24 turns are connected together in series circuit relation in the numbered order marked on the drawing. All the coils are wound in the same rotational direction, but in order to simplify the series cross-overs from one coil to another, it is preferable to wind the coils alternately radially inward and radially outward as indicated by the turn numbers in each coil. Preferably each coil is wound using two conductors spirally wound together with their turns in mutual radially interleaved relation. Adjacent pairs of oppositely wound coils constituting an interlaced set of coils are cross-connected with the several conductors of each coil in electrically spaced-apart series circuit relation, as will be more evident hereinafter.

It may be observed at FIG. 2 that the two parallel conductors entering coil 120 at the outside turns 1 and 7 are downwound in interleaved relation in coil 120. Turn numbering indicates that in coil 121 two interleaved conductors are wound radially outward, or upwound. A high voltage incoming lead 130 enters the winding at the second turn from the peripheral edge of the coil 120 and forms the indicated first turn 1 of the winding. This is the innermost end turn (at the outside edge) of the two interwound conductors in coil 120. The series circuit then traverses coil 120 inwardly through turns 2 and 3 and is thereafter cross-connected by a jumper 131 to one of the conductors in coil 121. The entering turn 4 in coil 121 is the innermost end turn (at the inside edge) of the two conductors in that coil. The circuit, then, traverses 121 outwardly through turns 4, 5 and 6 and re-enters coil 120 through a jumper 132. The circuit then traverses the coil 120 inwardly for a second time through the conductor beginning at turn 7 and proceeding through turns 8 and 9. Turn 9 is cross-connected through a jumper 133 to the second conductor in coil 121, and the circuit traverses coil 121 for a second time through turns 10, 11 and 12. All of the conductors of coils 120 and 121 have now been utilized in mutually interlaced manner, with the series circuit traversing each coil a plurality of times before proceeding through a jumper 134 to a next set of coils. The interconnected pair of coils 120 and 121 is hereinafter referred to as a "set" or interlaced set, and it will be evident that the coils 122 and 123 constitute a second similarly interlaced set or winding section. It will be understood that following coil 123 the high voltage winding may be continued through any desired number of similar sets of interlaced or non-interlaced coils to a low voltage terminal.

In the interlaced winding sections 111 shown at FIG. 2, the electrical stress between the inner peripheral edges of the coils 120 and 121 is measured by the voltage drop between turns 3 and 10 of the winding, i.e., the voltage drop across 7 turns in series. Similarly, the section-to-section stress between the adjacent outer peripheral edge of coils 121 and 122 is the drop across 13 turns in series (i.e., between turns 6 and 19). At the inner periphery of these coils the section-to-section drop is between turns 10 and 15 only, a 5-turn drop.

It may now be observed that if at FIG. 2 the high voltage lead 130 had been brought into the winding at the outermost turn of coil 120, then the section-to-section voltage drop between coils 121 and 122 would be that of a single turn at the outer edge (i.e., between turns 12 and 13), but at the inner edge there would be a 17-turn drop (i.e., between turns 4 and 21). By merely connecting the incoming lead to the second turn of the first coil, I reduce inner edge section-to-section voltage stress to less than one-third the value it would otherwise have. While the section-to-section stress at the outer peripheral edge of coils 121, 122 is twice the inner edge stress, it is still smaller than the maximum edge stress with first-turn entrance of lead 130 and is removed to a location remote with respect to grounded parts.

In some transformers it may be desirable because of the relative proximity of low voltage parts to provide for minimum coil-edge stress at the radially inner edge of the coil 111. At FIG. 3, I have shown that this can be accomplished by reversing the turn order in each coil. At FIG. 3 a group of 2-conductor disk coils 120', 121', 122' and 123' is interlaced in the two sets in the numbered turn order shown. As indicated by turn numbers, the end coil 120' is upwound rather than downwound, so that the first turn (1) of the series circuit is the second turn at the inner peripheral edge of coil 120'. By the resulting inverse turn sequence the maximum section-to-section edge stress is at the inner edges of coils 121' and 122'. Other parts of FIG. 3 corresponding to parts of FIG. 2 have been marked with the same reference numerals.

Those skilled in the art will now appreciate that my improved terminal connection for interlaced coil sections through an innermost end turn of each group of interwound coil conductors is applicable to a variety of interlacing arrangements. For example, a single series circuit re-entering each coil *n* times would begin its initial traverse of each coil at the innermost end turn of the group of end conductors in that coil. Moreover, if several series circuits are carried in parallel through the coils, each coil would be formed of a like number of conductor groups. In such case each series circuit would begin its first traverse of each coil at the innermost end turn of the conductor group included in that circuit. For example, I have shown at FIG. 4 an embodiment of my invention where each coil is formed of two groups of two conductors each, the two groups of conductors in each coil being in separate series circuits connected in parallel.

In the modification shown at FIG. 4, each coil 120''–123'' is formed of four turns of two-stranded conductor and thus comprises four interleaved spiral conductors or strands. The first turns of the second and fourth strand are connected in parallel circuit relation to the high voltage lead 130, and two interlaced series circuits are formed through the winding using one strand of each conductor in each circuit with the series circuits connected in mutually parallel relation between terminals. This will be evident from the turn-numbering sequence at FIG. 4, bearing in mind that the series circuit formed of one set of strands is numbered as turns 1, 2, 3, etc., and the series circuit formed of the other set of strands proceeds through turns numbered 1a, 2a, 3a, etc. As in the case of FIG. 2, the first two coils 120'' and 121'' constitute a section in which all strands of all conductors are utilized in the series circuits before the circuits continue in parallel through cross-overs 134 and 134a to the next section. It will be evident to those skilled in the art that in the winding at FIG. 4 the outside cross-overs (i.e., coils 4 to 5 and 4a to 5a) may be transposed if desired. In such case, turns 5 and 5a, 6 and 6a, 7 and 7a and 8 and 8a, will each be interchanged in position.

It will now be evident to those skilled in the art that my invention is applicable in like manner to parallel circuit interlaced disk coils wherein not all the parallel circuits are reentrant in each winding section. In such case the number of conductors in each conductor group may be an odd number. In all cases the technique of beginning the series circuits through the winding, whether they be one or more in number, at an innermost end turn of each conductor group has the advantage that electrostatic stress between adjacent inner and outer edges of adjacent coils and adjacent winding sections is minimized or located in a less severely stressed area.

Thus while I have illustrated only certain preferred embodiments of my invention by way of example, many additional modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. An inductive winding for electrical apparatus comprising a plurality of coaxially disposed annular coils spirally wound in the same direction alternately radially outward and radially inward, each said coil being formed of at least one group of at least two spiral conductors in radially interleaved relation, each said conductor having end turns adjacent the inner and outer peripheral edges of said coil and radially juxtaposed end turns of each conductor group including an innermost end turn with respect to each peripheral edge of said coil, and means connecting all conductors of one conductor group in a set of at least two coils in a series circuit traversing one conductor of each coil in predetermined sequence and repeating the traverse of all other conductors of each group in like coil sequence, said series circuit beginning its first traverse of each said coil at one innermost end turn of an interleaved conductor group and terminating its last traverse of said coil at the other innermost end turn of the same conductor group.

2. An inductive winding according to claim 1 comprising at least two sets of coils with at least one series circuit through each set connected in like conductor sequence and mutually in series circuit relation.

3. An inductive winding according to claim 1 wherein said series circuit begins its first traverse of axially adjacent coils at the innermost end turns alternately adjacent the inner and outer peripheral edges of said coils.

4. An inductive winding according to claim 1 wherein each said annular coil is formed of at least two groups of spiral conductors and at least one said group includes a plurality of conductors, each conductor group being connected in a separate series circuit and said circuits being connected in parallel circuit relation, the circuit comprising said one conductor group traversing each coil of said set of coils in repeated series sequence and beginning its first traverse of each said coil at one peripherally innermost end turn of all interlaced conductor groups in such coil.

5. An inductive winding according to claim 4 wherein each said annular coil is formed of a plurality of groups of spiral conductors having equal numbers of conductors in each group, each said series circuit traversing each coil of said set of coils in repeated series sequence and beginning its first traverse of each said coil at one innermost end turn of that conductor group included in such series circuit.

6. An inductive winding according to claim 2 wherein each said annular coil is formed of at least two groups of spiral conductors and each said group includes a plurality of conductors, each condutor group being connected in a separate series circuit and said series circuits being connected in parallel circuit relation, each said series circuit traversing each coil of each said set of coils in repeated series sequence and beginning its first traverse of each said coil at one innermost end turn of that conductor group in such series circuit.

References Cited

UNITED STATES PATENTS

| | | | |
|---|---|---|---|
| 2,453,552 | 11/1948 | Stearn | 336—70 XR |
| 2,725,538 | 11/1955 | Grimmer | 336—70 |
| 3,090,022 | 5/1963 | Stein | 336—70 |
| 3,299,385 | 1/1967 | Stein | 336—70 XR |
| 3,405,378 | 10/1968 | Martin | 336—70 |

FOREIGN PATENTS

| | | |
|---|---|---|
| 221,166 | 5/1962 | Austria. |
| 595,554 | 4/1960 | Canada. |
| 375,791 | 4/1964 | Switzerland. |
| 349,689 | 12/1960 | Switzerland. |

OTHER REFERENCES

German printed application 1,082,342, May 25, 1960, Smith et al.

THOMAS J. KOZMA, Primary Examiner

U.S. Cl. X.R.

336—187